US012711325B2

(12) United States Patent
Katirai

(10) Patent No.: US 12,711,325 B2
(45) Date of Patent: Aug. 18, 2026

(54) COMPUTER SYSTEM AND METHOD FOR PLAGIARISM CHECKING AND REMEDIATION

(71) Applicant: PharmAchieve Corporation Ltd., Toronto (CA)

(72) Inventor: Hooman Katirai, Toronto (CA)

(73) Assignee: PharmAchieve Corporation Ltd., Toronto (CA)

(*) Notice: Subject to any disclaimer, the term of this patent is extended or adjusted under 35 U.S.C. 154(b) by 0 days.

(21) Appl. No.: 18/987,265

(22) Filed: Dec. 19, 2024

(65) Prior Publication Data

US 2026/0178841 A1 Jun. 25, 2026

(51) Int. Cl.

| | |
|---|---|
| ***G06F 40/289*** | (2020.01) |
| ***G06F 16/334*** | (2025.01) |
| ***G06F 40/166*** | (2020.01) |
| ***G06F 40/40*** | (2020.01) |
| ***G06V 10/74*** | (2022.01) |
| ***G06V 30/19*** | (2022.01) |
| ***G06V 30/262*** | (2022.01) |
| ***G06V 30/414*** | (2022.01) |

(52) U.S. Cl.

CPC .......... *G06F 40/40* (2020.01); *G06F 16/3347* (2019.01); *G06F 40/166* (2020.01); *G06F 40/289* (2020.01); *G06V 10/761* (2022.01); *G06V 30/19093* (2022.01); *G06V 30/274* (2022.01); *G06V 30/414* (2022.01)

(58) Field of Classification Search

None

See application file for complete search history.

(56) References Cited

U.S. PATENT DOCUMENTS

| | | | | |
|---|---|---|---|---|
| 11,586,814 | B2 * | 2/2023 | Jiang | G06F 40/237 |
| 11,748,555 | B2 | 9/2023 | Tran | |
| 11,829,721 | B2 | 11/2023 | Niu et al. | |
| 11,989,507 | B2 | 5/2024 | Tunstall-Pedoe et al. | |

(Continued)

FOREIGN PATENT DOCUMENTS

| | | | |
|---|---|---|---|
| AU | 20211101011 | A4 | 4/2021 |
| CN | 112527968 | A | 3/2021 |

(Continued)

OTHER PUBLICATIONS

Hassanipour S, Nayak S, Bozorgi A, Keivanlou M, Dave T, Alotaibi A, Joukar F, Mellatdoust P, Bakhshi A, Kuriyakose D, Polisetty L , Chimpiri M, Amini-Salehi E The Ability of ChatGPT in Paraphrasing Texts and Reducing Plagiarism: A Descriptive Analysis JMIR Med Educ 2024, (Year: 2024).*

(Continued)

*Primary Examiner* — Chan S Park

(57) ABSTRACT

Methods, devices, and processor-readable media for identifying and remediating plagiarism. One or more extracted text segments from a text document are identified as plagiarized text segments. For each plagiarized text segment: a set of instructions is generated for a generative artificial intelligence (AI) model that instruct the AI model to rephrase the plagiarized text segment; the set of instructions is provided to the AI model and a response is received from the AI model that includes a rephrased text segment. The rephrased text segment is substituted for the plagiarized text segment.

16 Claims, 4 Drawing Sheets

(56) References Cited

U.S. PATENT DOCUMENTS

| | | | | |
|---|---|---|---|---|
| 2022/0129629 | A1 | 4/2022 | Niu et al. | |
| 2022/0414317 | A1* | 12/2022 | Heyns | G06F 40/289 |
| 2023/0385320 | A1 | 11/2023 | Cai et al. | |
| 2024/0046392 | A1 | 2/2024 | Tudela et al. | |
| 2024/0394481 | A1 | 11/2024 | Edwards et al. | |

FOREIGN PATENT DOCUMENTS

| | | | |
|---|---|---|---|
| CN | 113011154 | A | 6/2021 |
| CN | 113673216 | B | 11/2021 |
| CN | 115204396 | A | 10/2022 |
| CN | 117034902 | A | 11/2023 |
| CN | 117573812 | B | 2/2024 |
| CN | 117743574 | A | 3/2024 |
| CN | 118093649 | A | 5/2024 |
| IN | 202341043393 | A | 9/2023 |
| KR | 10-1869362 | B1 | 5/2018 |
| KR | 10-2594382 | B1 | 10/2023 |
| KR | 10-2024-0073235 | A | 5/2024 |
| RU | 2814808 | C1 | 3/2024 |
| WO | 2024/118753 | A1 | 6/2024 |

OTHER PUBLICATIONS

Arabi et al. ("Improving plagiarism detection in text document using hybrid weighted similarity"), (Year: 2022).*

Gupta et al. ("External Plagiarism Detection: N-Gram Approach using Named Entity Recognizer") (Year: 2010).*

Haggag et al ("Plagiarism Candidate Retrieval Using Selective Query Formulation and Discriminative Query Scoring").(Year: 2013).*

Deng, Yihe et al. "Rephrase and Respond: Let Large Language Models Ask Better Questions for Themselves". arXiv:2311.04205v2 [cs.CL] .. Apr. 18, 2024.

Zirulnik, Martin. "A Chunk by Any Other Name: Structured Text Splitting and Metadata-enhanced RAG." Oct. 18, 2023. https://blog.langchain.dev/a-chunk-by-any-other-name/ (Last accessed: Nov. 13, 2024).

Parodi, Priscilla. "AI plagiarism: Plagiarism detection with Elasticsearch". Dec. 19, 2023. https://www.elastic.co/search-labs/blog/ai-lagiarism-checker-with-elasticsearch (Last accessed: Nov. 13, 2024).

GitHub—turnitin-core-api. https://github.com/turnitin/turnitin-core-api (Last accessed: Nov. 13, 2024).

Chan, W. et al., "A Case Study on ChatGPT Question Generation", 2023 IEEE International Conference on Big Data, Dec. 15-18, 2023 (Dec. 18, 2023).

Hadzhikoleva, S. et al., "Automated Test Creation Using Large Language Models: A Practical Application", Applied Sciences, vol. 14, No. 19, Oct. 9, 2024 (Sep. 10, 2024). [Retrieved from the Internet on Jun. 10, 2025 (Oct. 6, 2025) at URL: https://www.mdpi.com/2076-3417/14/19/9125].

Li, C. et al., "Learning to Rewrite Prompts for Personalized Text Generation" Proceedings of the ACM Web Conference 2024 (WWW '24), Singapore, Singapore, May 13-17, 2024 (May 17, 2024). [Retrieved from the Internet on Jun. 11, 2025 (Oct. 6, 2025) at URL: https://dLacm.org/doi/pdf/10.1145/3589334.3645408].

Pawar, P. et al., "Automated Generation and Evaluation of MultipleChoice Quizzes using Langchain and Gemini LLM", 2024 International Conference on Electrical Electronics and Computing Technologies (ICEECT), IEEE, Greater Noida, India, Aug. 29-31, 2024 (Aug. 31, 2024).

* cited by examiner

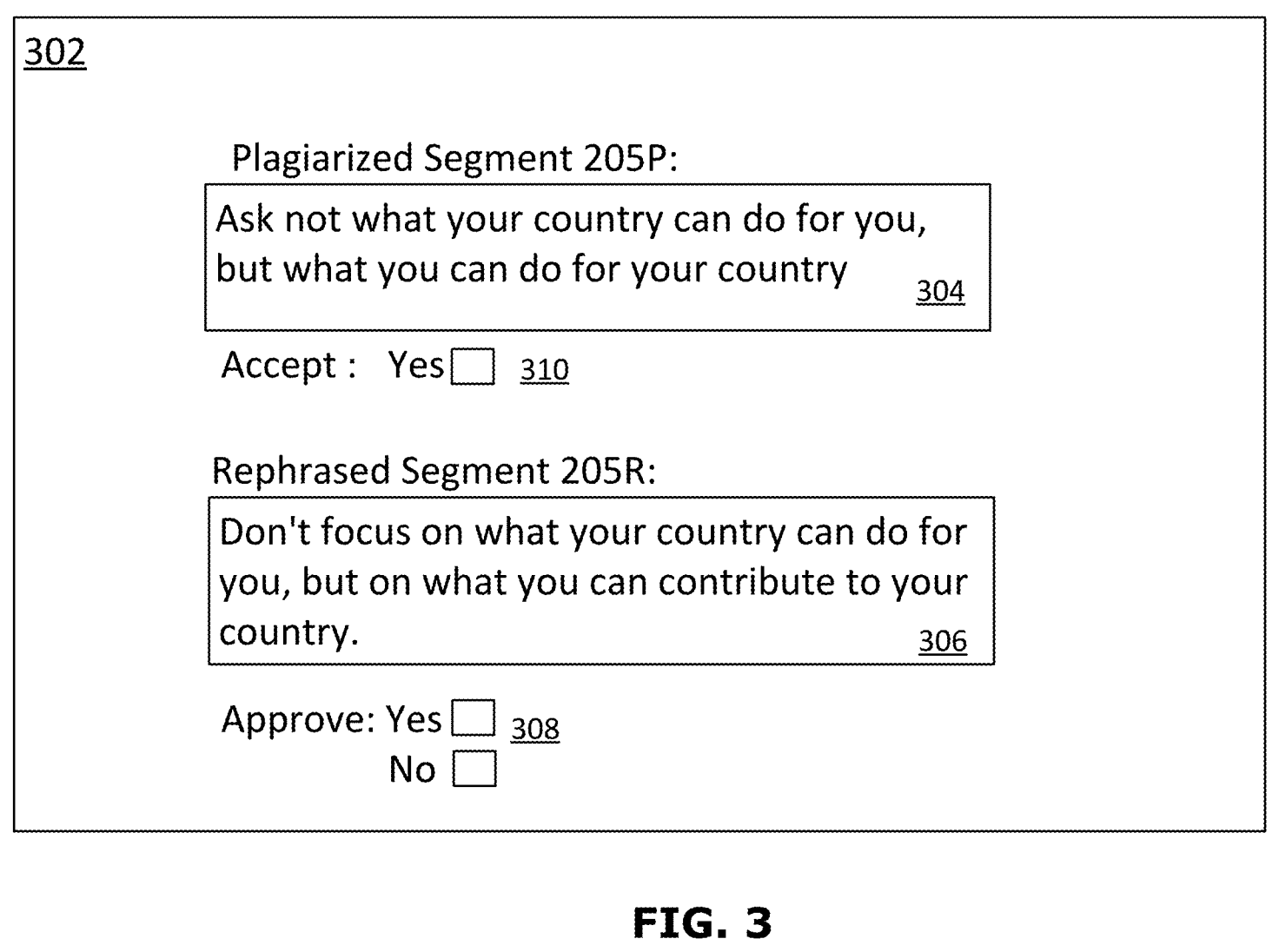

302

Plagiarized Segment 205P:

Ask not what your country can do for you, but what you can do for your country 304

Accept : Yes ☐ 310

Rephrased Segment 205R:

Don't focus on what your country can do for you, but on what you can contribute to your country. 306

Approve: Yes ☐ 308
No ☐

FIG. 3

COMPUTER SYSTEM AND METHOD FOR PLAGIARISM CHECKING AND REMEDIATION

RELATED APPLICATION DATA

This is the first-filed application for this disclosure.

FIELD

The present application generally relates to the use of computer systems that check for and remediate plagiarism, and more particularly to improvements in an efficiency and a performance of an automated system for preventing plagiarism.

BACKGROUND

The prevalence of written works that are available in electronic format and the use of automated processing systems to generate new written works can give rise to unintended instances of plagiarism occurring.

Automated systems and methods that can provide plagiarism free output are desirable. Generative systems can require extensive computing resources that consume high amounts of power. When such systems generate works that inadvertently include plagiarized text results in inefficient use of computing resources and power. Accordingly, there is a need for automated systems that can check and remediate plagiarism.

SUMMARY

According to one example aspect, a computer-implemented method is disclosed for identifying and remediating plagiarism. The method includes identifying, by one or more processors, one or more extracted text segments from a text document as plagiarized text segments. For each extracted text segment identified as a plagiarized text segment the method can include: generating, by the one or more processors, a set of instructions for a generative artificial intelligence (AI) model that instruct the AI model to rephrase the extracted text segment; providing, by the one or more processors, the set of instructions to the AI model and receiving a response from the AI model that includes a rephrased text segment generated by the AI model; and substituting, by the one or more processors, the rephrased text segment for the extracted text segment.

In some examples, identifying the one or more extracted text segment as plagiarized text segments comprises, by the one or more processors causing, for at least some extracted text segments, one or more automated searches to be performed to search for one or more respective candidate matching text segments. For each extracted text segment for which at least one or more respective candidate matching text segments are identified by the searching, the method can include identifying the extracted text segment as a plagiarized text segment responsive to determining that a similarity between the extracted text segment and at least one of the one or more of the respective candidate matching text segments meets a similarity threshold.

In some examples, causing the one or more automated searches to be performed includes, for at least one of the extracted text segments: performing a first search, in respect of the at least one extracted text segment, the first search comprising: obtaining a respective vector embedding for the at least one extracted text segment; searching a vector database that comprises reference text vector embeddings of respective reference text segments extracted from literary works to identify reference text vector embeddings that meet a similarity criteria with respect to the respective vector embedding for the at least one extracted text segment; wherein the respective reference text segment for any reference text vector embedding that meets the similarity criteria is identified as a respective candidate matching text segment for the extracted text segment. In some examples, the similarity criteria comprises at least one of: a cosine distance; a Jaccard similarity; a word embedding vector distance; or a Levenshtein distance.

In some examples, causing the one or more automated searches to be performed includes, for at least one of the extracted text segments: performing a second search in respect of the extracted text segment, comprising: generating a query for a remote search platform requesting identification of one or more respective candidate matching text segments for the extracted text segment; and receiving a response to the query.

In some examples, the remote search platform comprises a metasearch engine that is configured to provide corresponding queries to and aggregate results from multiple search engines based on the query. In some examples, the remote search platform comprises a plagiarism check engine.

In some examples, the method includes, prior to causing the one or more automated searches to be performed: segmenting the text document to obtain a set of text segments that collectively represent the text of the text document; and identifying as key text segments a subset of the set of text segments that meet predefined relevance criteria, wherein at least some of the one or more automated searches are selectively performed only in respect of extracted text segments included in the identified subset of key text segments.

In some examples, segmenting the text document to obtain a set of text segments comprises performing one or more of: fixed sized chunking; semantic chunking or sentence chunking.

In some examples, the similarity threshold is based on a defined number of identical consecutive words in occurring in the extracted text segment and the plagiarized text segment.

In some examples, the method includes, after substituting the rephrased text segment for the extracted text segment: causing the one or more automated searches to be performed to search for one or more respective candidate matching text segments in respect of the substituted extracted text segment; identifying the substituted extracted text segment as a further plagiarized text segment responsive to determining that a similarity between the substituted extracted text segment and at least one of the one or more of the respective candidate matching text segments meets the similarity threshold; generating a further set of instructions for the AI model that instruct the AI model to rephrase the further plagiarized text segment; providing the further set of instructions to the AI model and receiving a further response from the AI model that includes a further rephrased text segment generated by the AI model; and substituting the further rephrased text segment for the substituted extracted text segment.

In some examples, the AI model comprises a large language model (LLM).

In some examples, the methods includes, prior to substituting the rephrased text segment for the extracted text segment: causing a graphical user interface (GUI) to be generated that enables a client device to receive user inputs that amend the rephrased text segment; and wherein substituting the rephrased text segment for the extracted text segment includes including any user inputs that amend the rephrased text segment in the substituted extracted text segment.

In some examples, the text document comprises question unit content for an examination question, the question unit content including: a question related to the question scenario; a set of answer choices; for each answer choice, an indication of whether the answer choice is correct or incorrect and an explanation of why the answer choice is correct or incorrect; and identification of at least one reference that supports the set of answer choices.

According to a further example aspect, a system is disclosed that includes or more processors, and one or more memories storing machine-executable instructions thereon which, when executed by the one or more processors, cause the system to perform the method of any one of the preceding methods.

According to a further example aspect, a non-transitory processor-readable medium is disclosed having machine-executable instructions stored thereon which, when executed by one or more processors, cause the one or more processors to perform the method of any one of the preceding methods.

According to a further example aspect, computer program is disclosed that configures a computer system to perform the method of any one of the preceding methods.

According to a further example aspect, an apparatus is disclosed that is configured to perform the method of any one of the preceding methods.

BRIEF DESCRIPTION OF THE DRAWINGS

Reference will now be made, by way of example, to the accompanying drawings which show example embodiments of the present disclosure, and in which:

FIG. 3 illustrates an interactive user interface display for enabling a user to approve and edit rephrased text segments.

Similar reference numerals may have been used in different figures to denote similar components.

DESCRIPTION OF EXAMPLE EMBODIMENTS

Examples of systems and methods for plagiarism checking and remediation. The disclosed examples describe systems and methods that can improve the efficiency and operation of computer systems that are used for generating text and/or detecting plagiarism. In example embodiments, plagiarism refers to copying the work of another party, and can include, but is not limited to, copyright infringement.

Figure 1:
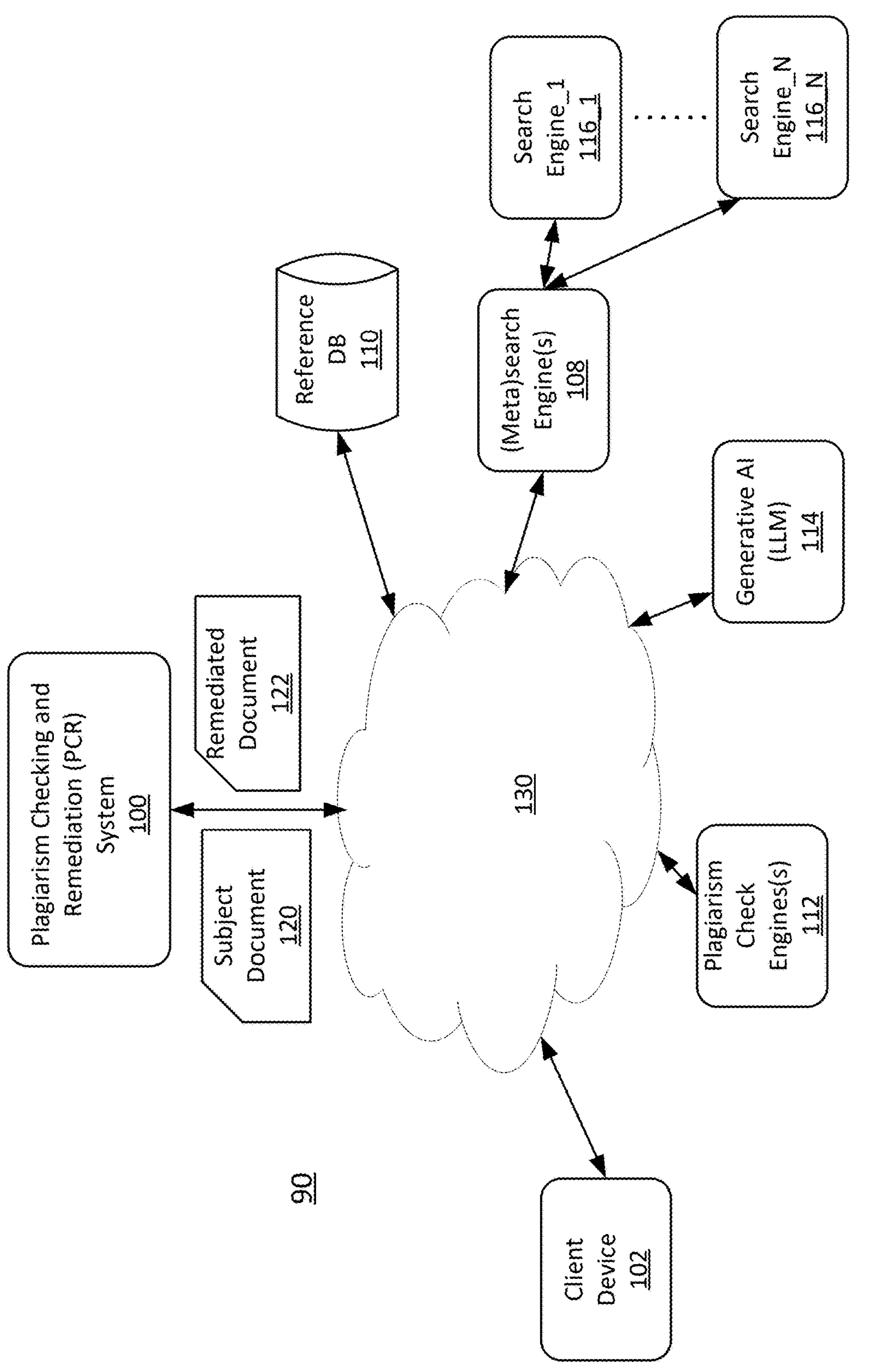
FIG. 1 is a block diagram showing an environment that includes a plagiarism detection and remediation system according to example embodiments.

FIG. 1 shows an example of an automated plagiarism checking and remediation (PCR) system 100 within an environment 90 that comprises a plurality of computer implemented components that are interconnected by a data communications network 130 according to example embodiments. Data communications network 130 can include one or more digital communications networks that communicate information between devices using defined protocols and formats, including for example, one or more of the Intranet, intranets, wired and wireless local area networks, cellular data networks, virtual private networks, and the like.

In example implementations, a computer implemented component refers to a combination of computer hardware and software. The software can be executed by the computer hardware to cause the computer implemented component to perform a set of functions and operations to accomplish one or more tasks.

In an example embodiment, PCR system 100 can include one or more computer implemented servers that are configured to interact with the other computer implemented components of environment 90 through data communications network 130. These other computer implemented components may, for example, include: a client device 102, a generative AI model 114 such as a Large Language Model (LLM), a reference database 110, and one or more remote search platforms such as a search engine 108 and a plagiarism check engine 112. Although only one instance of these components is shown in shown in FIG. 1, the environment 90 can include several of such components. Furthermore, in some examples, the functionality of one or more of these additional components can be integrated into the PCR system 100.

Client device 102 can, for example, be a computer system such as a personal computer, a laptop, a mobile smart phone or the like that includes user input and output devices that enables an end-user to interact with the PCR system 100.

In the illustrated example, generative AI model 114 is configured to generate output that includes text in response to input prompts. In at least some examples generative AI model 114 can include a commercially available LLM, for example an LLM provided as a Software-as-a Service such as an LLM provided by ChatGPT™, Claude™, or Llama™. In some examples, PCR system 100 may access multiple generative AI models.

In an example implementation, reference database 110 is a searchable database that is used to store representations of known literary works. In one example, reference database 110 is a vector database that provides digital representations of the text included in a set of known literary works. In one example, these digital representations are obtained by the following process: (i) each literary work is segmented into parts (e.g., reference text segments) that can each include one or more words. For example, each reference text segment can include the words that make up a discrete sentence, or the words that make up the sentences of a discrete paragraph. (ii) the reference text segments are then converted into respective vector embeddings (e.g., reference text segment vectors). These reference text segment vectors are stored in the reference database 110 to enable searching by vector. Each reference text segment vector can be associated with a copy of its original source text or with metadata that links it back to its original source text.

In an example implementation, search engine 108 is a web-server hosted service configured to provide search queries to multiple different search engines based on a single application program interface (API) call from PCR system 100. For example, search engine 108 can be a metasearch engine, otherwise known as an aggregator, that sends queries to several search engines and either aggregates the results into one master list or categorizes the results by the search engines they come from.

In an example implementation, plagiarism check engine 112 is a web-server hosted component that analyzes written content to identify instances of unoriginal text, aiming to ensure the originality and authenticity of a document. Plagiarism check engine 112 compares submitted text that is included in an API request against a vast database of online sources, academic papers, books, and other publications, as well as previously submitted documents, to detect similarities. In some examples, plagiarism check engine 112 returns an output that includes information that highlights matching phrases, sentences, or paragraphs, and often assigns a percentage score indicating the extent of similarity found.

Although the PCR system 100 is shown as a distributed system, in alternative examples multiple components can be hosted on a common computer system. Furthermore, in some examples, the functionality of some of the components may be distributed across multiple computer systems.

In an example embodiment, access to PCR system 100 is provided under a Software-as-a-Service (Saas) model by a SaaS provider that operates the PCR system 100. For example, an authorized end user registered with the PCR system 100 may access the PCR system 100 through a web browser present on client device 102 with the purpose of having the PCR system 100 interface with the remaining components of environment 90 to check for plagiarism issues in a text document 120, remediate any identified plagiarism issues, and output a remediated document 122.

Figure 2:
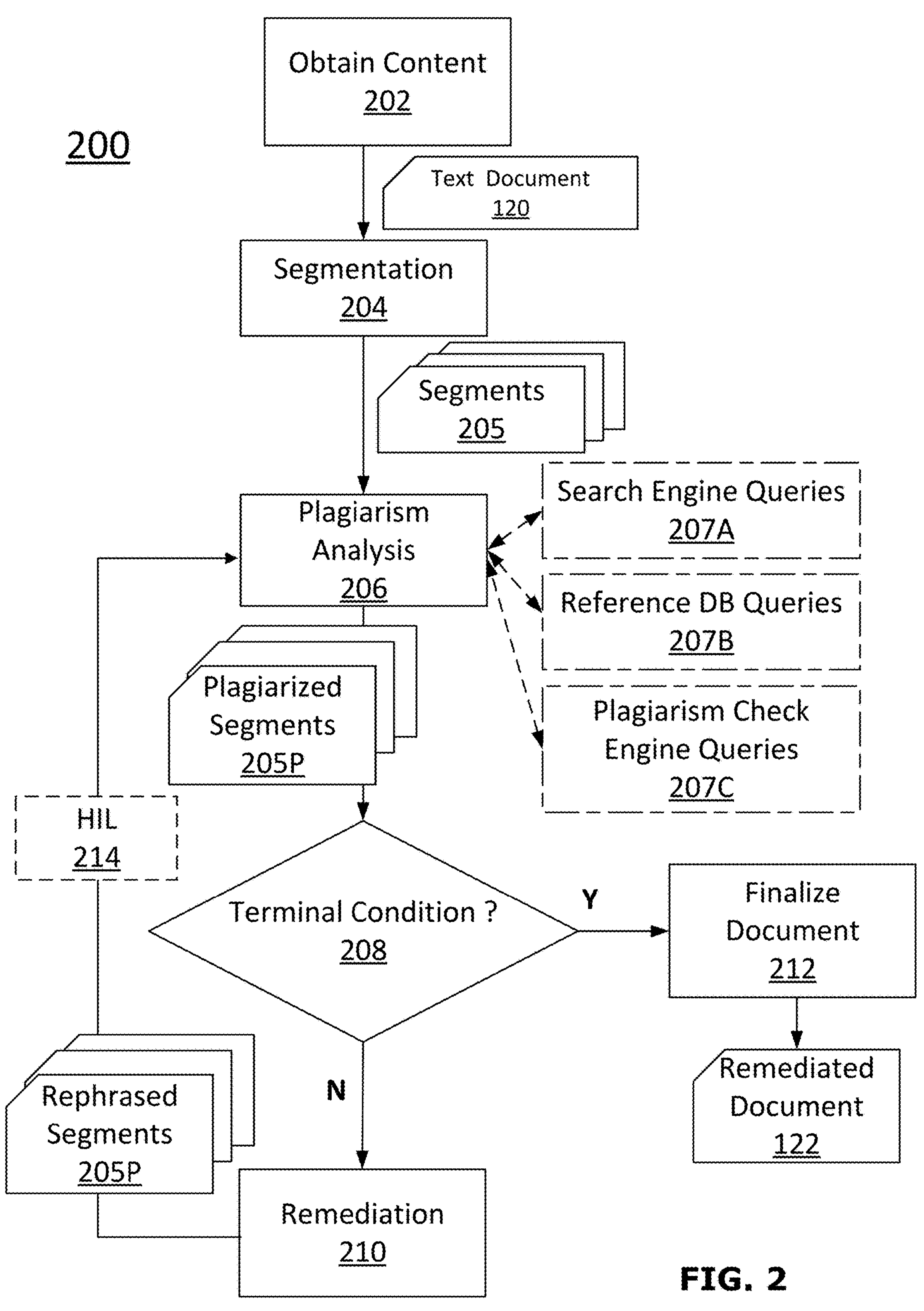
FIG. 2 is a flow diagram illustrating a process performed by the plagiarism detection and remediation system of FIG. 1 according to example embodiments.

The functionality of PCR system 100 and other components of the environment 90 will now be described in greater detail below with reference to the flowchart of FIG. 2, which shows a set of operations of a check and remediation process 200 that can be performed by PCR system 100.

Check and remediation process 200 commences with the PCR system 100 obtaining content for checking and remediation. For example, in the illustrated example, the PCR system 100 receives the text document 120 as part of an obtain content operation 202. The text document 120 can be any data structure that includes natural language text. In some examples, the text document 120 obtained by the PCR system 100 can be the text output of a generative AI model (for example, generative AI model 114 or another specified generative AI model) that has been generated in response to a prompt provided to the generative AI model. For example, in an illustrative use scenario, a user interacts with client device 102 to cause a prompt to be provided through a web interface to a generative AI model which in turn outputs the text document 120. A user then interacts with client device 102 to request, through a web interface provided by the PCR system 100, that the PCR system 100 upload, check and remediate the text document 120. In some use scenarios, PCR system 100 may be configured to automatically receive the text document 120 directly from a generative AI model without any intermediate user intervention.

In some examples, text document 120 can be a manually generated document or a hybrid document that includes both AI and human generated content. In some examples, the text document 120 can be a portion of a larger document. In some examples, the text document 120 includes content for a question unit that has been generated by a LLM for use in a standardized examination, such as disclosed for example in U.S. patent application Ser. No. 18/941,816, filed Nov. 8, 2024, entitled "COMPUTER SYSTEM AND METHOD FOR AUTOMATED EXAMINATION QUESTION GENERATION", the content of which is incorporated herein by reference. In some examples, question unit content includes: a question related to the question scenario; a set of answer choices; for each answer choice, an indication of whether the answer choice is correct or incorrect and an explanation of why the answer choice is correct or incorrect; and identification of at least one reference that supports the set of answer choices.

Once obtained, the text document 120 is then subjected to a segmentation operation 204 during which the text contained in the document is broken down into a group of smaller text segments 205 (also referred to as chunks) that are extracted from the text document 120 and output for processing by downstream plagiarism check and remediation operations 206, 210. Segmentation operation 204 can include a segmenting process. Segmenting can, for example, be performed using one or a combination of known chunking methodologies, and in some examples, different segments can include overlapping text. By way of example, text of the text document 120 can be segmented using one or more of the following automated segmentation techniques:

(a) Fixed Sized Chunking—in some examples, the input text is divided into a set of consecutive segments based a fixed character length (e.g., the input text is divided into chunks of Length=1024 characters each. In some examples, the consecutive segments can each overlap by a defined number of characters.

(b) Semantic Chunking—in some examples, a semantic based process is applied to segment the input text into variable length segments that each include related content. This can, for example, result in segments that resemble paragraphs from the input text.

(c) Sentence Chunking—in some examples, the input text is divided into segments that correspond to sentences in the input text. For example, segmenting algorithms can be applied that focus on extracting sentences from an overall text. A sentence is one thought and can be what is normally thought of as a sentence (e.g. something that ends in a period" or in other examples can be some other chunk of text that is a distinct thought such as a bullet point in a bulleted list. The output of this process is a list of sentences that can be searched in subsequent steps for plagiarism or copyright infringement. In some examples, the PCR system 100 can be configured to make an API call for sentence-based segmenting to a Natural Language Processing (NLP) engine (for example SpaCY™) that has been configured to perform sentence-based segmentation.

In some examples, relevance-based segment selection can also be performed as part of segmentation operation 204 to potentially reduce the potential of number of text segments that need to be processed in downstream operations. By way of example, named entity recognition (NER) techniques can be applied to sentence segments that have been obtained using the sentence segmentation described above to classify a relative importance of the text segment. For example, sentence segments can be processed using one or more NER algorithms that are configured to detect predefined nouns or classes of nouns (such as names of people, and things in sentences). Sentences with named entities can be classified as key segments. In some examples, these key segments can be associated with a metadata label that identifies them as key segments. Sentence segments that have not been identified as key segments can then be ignored for some or all of the downstream processing steps, thereby optimizing system performance by reducing or limiting the demand for one or more types of computing resources (e.g., number of required computations, API calls, network traffic, memory usage and/or power consumption) that would otherwise be required for downstream processing, and/or improving the accuracy of downstream operations.

It will thus be appreciated that segmentation operation 204 outputs a set of text segments 205 that collectively represent the content of text document 120. In some examples, the text segments 205 may have been filtered to limit the set of output text segments 205 or to selectively flag some of the output text segments 205 as key segments (for example, in some use cases text segments 205 can be filtered to include only key sentences, or can include all identified text segments with a subset of the segments being flagged as key sentences). The text segments 205 can include one or more type of segments, for example: fixed size segments based on a defined number of characters, semantic-based segments of varying sizes (also referred to as paragraph segments); sentence segments of varying sizes; and/or key segments of varying sizes. Each of the segments can include or be associated with respective metadata that links the segment to corresponding section of text in the text document 102.

The text segments 205 are then each processed by plagiarism analysis operation 206. As explained in greater detail below, plagiarism analysis operation includes a set of processes that analysis text segments 205 to identify plagiarized text segments 205P that are likely to be considered to be the result of plagiarism (whether intentional or otherwise).

In some examples, plagiarism analysis operation 206 can include one or more preliminary segment cleaning steps to further prepare the text included in identified text segments 205 for downstream processing. For example, a segment cleaning process that may be performed by segmentation operation 204 can include one or more of the following: (i) all text in a segment is converted to lowercase; (ii) all words shorter than a defined number of characters (e.g., three characters) are removed; (iii) predefined words that are perceived as providing little meaning are removed (e.g., stop words that have very little meaning such as "of", "and", "the", etc. are removed); and/or (iv) all non-alpha numeric characters are removed. This cleaning process can also optimize system performance by reducing or limiting the demand for one or more types of computing resources (e.g., number of required computations, API calls, network traffic, memory usage and/or power consumption) that would otherwise be required for downstream processing, and/or improving the accuracy of downstream operations.

In the illustrated example, as part of plagiarism analysis operation 206, PCR system 100 automatically generates queries for multiple data content sources including, for example, metasearch engine 108, reference database 110, and plagiarism check engine 112.

In one example, as part of plagiarism analysis operation 206, PCR system 100 automatically generates a series metasearch engine queries 207A, in the form of API calls, for metasearch engine 108. Each query 207A can include a respective text segment 205. Metasearch engine 108, in turn, queries multiple search engines 116_1 to 116_N to identify candidate text segment matches that are identical or similar to the searched text segment 205. Each of the respective search engines 116_1 to 116_N returns a respective set of candidate text "matches". Each candidate text segment match can include: (i) the text that has been identified as matching the searched text segment 205; and (ii) a match ranking (e.g., a relevance or similarity score). In some cases, the candidate text segment match can also include source data that indicates a source of the matching text. The candidate text segment matches returned by each respective search engine 116_1 to 116_N will depend on the matching criteria, search methodology and reference sources that are accessed by the respective search engine 116_1 to 116_N, thus providing a search diversity across the search engines 116_1 to 116_N.

The metasearch engine 108 can aggregate the candidate text segment matches that are returned by the respective search engines 116_1 to 116_N for each respective text segment 205 into an aggregated or compiled response, which is then returned to the PCR system 100. In some examples, metasearch engine 108 may filter the list to remove duplicates and/or limit it to a defined maximum number of matches. In some this filtering can be performed at PCR system 100.

In some examples, only key sentence text segments 205 are provided to metasearch engine 108 so as to reduce costs and resources that can be associated with API calls to the metasearch engine 108.

In one example, as part of plagiarism analysis operation 206, PCR system 100 generates a respective reference DB query 207B for reference database 110 for each respective text segment 205. As noted above, reference database 110 can be a vector database that provides digital representations of the text included in a set of known literary works in the form of reference text segment vectors. In such examples, each text segment 205 is first converted into a vector embedding using the same embedding techniques used to generate the vector embeddings of the represented literary works. The text segment vector embedding is then used to query the reference database 110 to identify matching reference text vectors using one or more similarity matching techniques. For example, a matching reference text vector can be determined based on meeting a defined similarity metric threshold such as cosine similarity, Jaccard similarity, word embedding vector distance, and/or Levenshtein distance). In some examples, the predefined match criteria can, for example, define selection thresholds such as a minimum similarity metric and/or a maximum number of matches. The actual reference text segments that correspond to the matching reference text segment vectors can then be retrieved. Thus, in example embodiments, the reference DB query 207B for each respective text segment 205 will also return a set of candidate text segment matches. Each candidate text segment match can include: (i) the text that has been identified as matching the searched text segment 205; and (ii) a match ranking (e.g., a relevance or similarity score). In some cases, the candidate text segment match can also include source data that indicates the literary work that is the source of the matching text.

In one example, as part of plagiarism analysis operation 206, PCR system 100 automatically also generates a respective plagiarism check engine query 207C directed to one or more plagiarism check engines 112 for each text segment. Each plagiarism check engine query 207C, for example, take the from of an API call to a plagiarism check service. By way of example, plagiarism engines can be accessed through APIs offered by service providers such as Turnitin™. Each plagiarism check service will apply its respective match criteria for identifying possible plagiarism issues.

As with the queries 207A and 207B noted above, each plagiarism check engine query 207C can return a respective set of candidate text segment matches. Each candidate text segment match can include: (i) the text that has been identified as matching the searched text segment 205; and (ii) a match ranking (e.g., a relevance or similarity score). In some cases, the candidate text segment match can include source data that indicates a source of the matching text.

In some examples, only key sentence text segments 205 are provided as queries 207C to plagiarism check engine 112 so as to reduce costs and resources that can be associated with API calls to the plagiarism check engine 112.

Accordingly, after performing queries 207A, 207B, 207C, each text segment 205 will have been subjected to multiple searches for possible matches with text segments from multiple data sources. Any identified matches for a text segment 205 are assembled by PCR system 100 into an aggregated list of candidate text segment matches for the text segment 205. In the case where the queries 207A, 207B, 207C do not return any candidate text segment matches for a particular text segment 205, that text segment 205 can be deemed as a non-plagiarized text segment and omitted from further analysis by plagiarism analysis operation 206.

In the case where queries 207A, 207B, 207C do result in a set of one or more candidate text segment matches for a particular text segment 205, as part of plagiarism analysis operation 206, PCR system 100 can perform a plagiarism confirmation check to apply predefined similarity threshold to assess if that text segment 205 needs to be remediated. In one example, the plagiarism confirmation check includes a word-by-word comparison of the text segment 205 with each of the candidate text segment matches that have been identified for the text segment 205, and the similarity threshold is a threshold number $N_t$ of matching words in a row. If at least $N_t$ successive words in the text segment 205 match $N_t$ successive words in any of its associated candidate text segments, the text segment 205 is identified as a plagiarized text segment 205P that requires remediation.

In the case where a text segment 205 have been cleaned to remove unimportant words, the candidate text segment matches identified in respect of the text segment 205 can be cleaned in a similar manner prior to performing the plagiarism confirmation check described above.

Accordingly, plagiarism analysis operation 206 outputs a set of plagiarized text segments 205P that require remediation. Plagiarized text segments 205P will typically be a subset of segments 205. In some examples, the set of plagiarized segments 205P may be a null set (e.g., in a case where no plagiarized segments 205P are identified in plagiarism analysis operation 206). At operation 208, PCR system 100 determines if a terminal condition has been reached or not. A terminal condition can for example occur either when: (a) the set of plagiarized segments 205P is a null set, indicating that none of the text segments 205 are in need of further remediation; or (b) a predefined number of iterations of plagiarism analysis operation 206 and remediation operation 210 have already been performed in respect of a text document 120, indicating that remediation of the document is not feasible.

In the event that, at operation 208, PCR system 100 determines that a terminal condition has not been reached then a remediation operation 210 is performed in respect of each of the plagiarized segments 205P. In an example implementation, the PCR system does for each plagiarized segment 205P by: (i) generating a respective generative AI model prompt that includes the plagiarized segment 205P and a request that the statement be rephrased into new text; (ii) sending the prompt (for example as an API call) to the generative AI model 114; and (iii) receiving a response from the generative AI model 114 that includes a rephrased segment 205R. In at least some examples, generating the respective generative AI model prompt for a plagiarized segment 205P can include inserting the text of the plagiarized segment 205P into a prompt template that includes instructions such as: "Rephase the following text segment. Keep it's semantic meaning. Do not plagiarize. The text segment is: {plagiarized segment 205P}".

The rephrased segments 205R are returned to plagiarism analysis operation 206 and used to replace their respective plagiarized text segments 205B and the processes of plagiarism analysis operation 206, terminal condition check operation 208 and remediation operation 210 is repeated for any of the until a terminal condition is reached. Typically, the number of plagiarized statements 205P that need to be processed per iteration will decrease.

In the case where the terminal condition detected in operation 208 indicates that remediation of the document is not feasible, an appropriate notification can be returned to client device 102.

In the case where the terminal condition detected in operation 208 indicates that there are no further plagiarized segments 105 that require remediation, the PCR system 100 performs a finalize document operation 212. In finalize document operation 212, a remediated document 122 is generated in which all text segments 205 of the original text document 120 that have been identified as plagiarized segments 205P are replaced with respective rephrased segments 205P that have been determined to be free of plagiarism. The resulting remediated document 122 can then be returned to client device 102 and/or stored in a non-transitory memory.

In some examples, a human-in-the-loop (HIL) operation 214 can be included in check and remediation process 200. In this regard, in one example implementation, as part of a HIL operation 214, PCR system 100 is configured to provide a web-based user interface that enables plagiarized segments 205P and their respective rephrased segments 205R to be presented as a graphical user interface (GUI) 302 on a display of client device 102, as illustrated in FIG. 3. In the illustrated example, GUI 302 includes a first field 304 that shows a plagiarized segment 205P as detected by plagiarism analysis operation 206 and a second field 306 that shows its corresponding rephased segment 205P as generated by generative AI model 114 as part of remediation operation 210. The GUI 302 also provides user selectable options 308 for approving or rejecting the rephrased segment 205R.

In at least some examples, the second field 306 that shows its corresponding rephased segment 205P is a user-editable field that enables a user of client device 102 to provide custom edits to rephased segment 205P prior to approving rephrased segment. Thus, HIL operation 214 can enable a human to determine if plagiarized content is resolved by the rephrased content. To assist the human in making this determination, GUI 302 displays (1) the sentence containing the plagiarized content with the suspected plagiarized portions of the sentence highlighted; and (2) the rephrased sentence. In some examples the human can manually edit the content to resolve the plagiarism. In some examples, when a rephrased segments is not approved, PCR system 100 will repeat remediation operation 210 to obtain a further rephrased segment 205P that is then presented to the user in GUI 302. In some examples, approved rephrased segments, whether edited or not, are subjected to plagiarism analysis operation to make sure the human approved or edited rephrased content is free of plagiarism.

In some examples, the GUI 302 provides a user selectable option 310 for accepting a problematic segment 205P and rejecting any rephrasing. For example, a user may have intentionally used a well-known phrase and wants to maintain that phrase in its original form without any modifications. In such case, when the PCR system 100 detects a user input indicating that a specific problematic statement 205P has been accepted "as is", the subject text segment is labelled as an approved text segment and omitted from further plagiarism checking and rephrasing operations performed in respect of the text document 120.

It will be appreciated that PCR system 100 can beneficially be used to mitigate against occurrences of plagiarism from any text including that outputted by a generative AI model.

Figure 4:
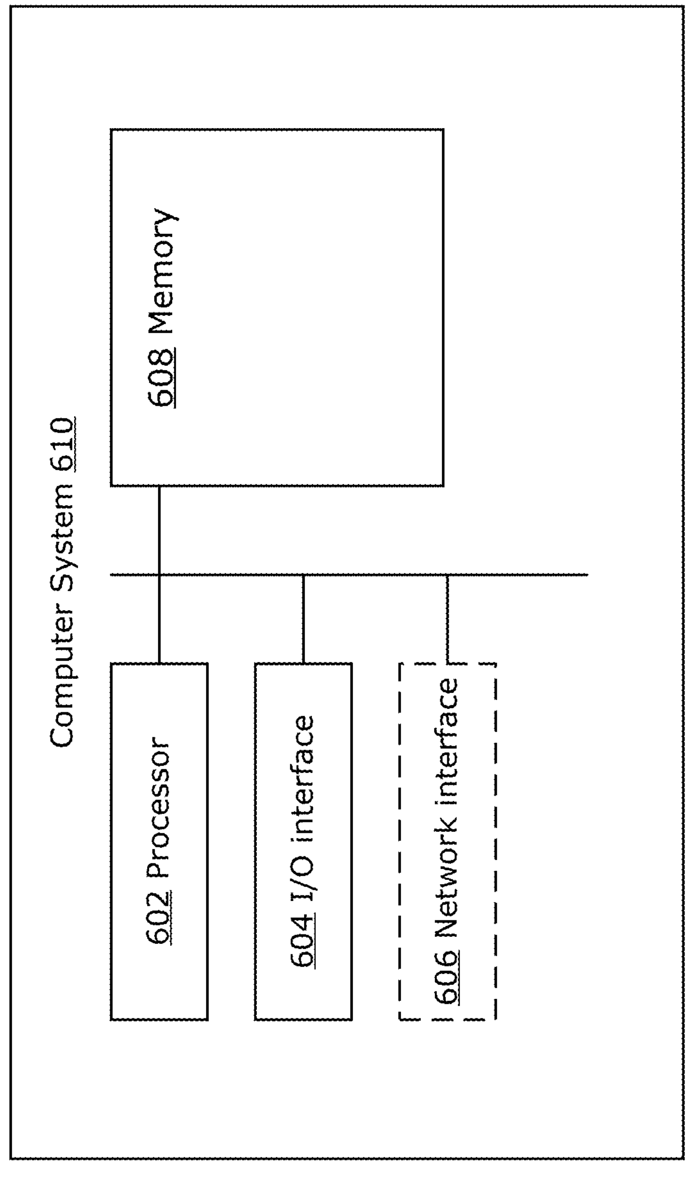
FIG. 4 is a block diagram of a computer system that can be configured to implement aspects of the disclosed methods and systems.

FIG. 4 illustrates an example of a computer system 610 that can be used to implement the one or more of the computer implemented components of the present disclosure, including for example PCR system 100. Computer system 610 includes one or more processors 602, such as a central processing unit, a general processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 602 may collectively be referred to as a "processor device". The computer system 610 also includes one or more input/output (I/O) interfaces 604, which interfaces with input devices (e.g., microphone) and output devices (e.g., speaker, display).

The computer system 610 can include one or more network interfaces 606 that may, for example, enable the computer system 610 to communicate with one or more further devices through a communications network such as a local area wireless network.

The computer system 610 includes one or more memories 608, which may include a volatile or non-volatile memory (e.g., a flash memory, a random access memory (RAM), and/or a read-only memory (ROM)). The non-transitory memory(ies) 608 may store instructions for execution by the processor(s) 602, such as to carry out examples described in the present disclosure. The memory(ies) 608 may include other software instructions, such as for implementing an operating system and other applications/functions. In the illustrated example, the memory 608 includes specialized software instructions for implementing one or more of the functions described above.

In some examples, the computer system 610 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the computer system 610) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the computer system 610 may communicate with each other via a bus, for example.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, SSDs, NVMe or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The terms "substantially" and "approximately" as used in this disclosure can mean that the recited characteristic, parameter, or value need not be achieved exactly, but that deviations or variations including for example, tolerances, measurement error measurement accuracy limitations and other factors known to those skilled in the art, may occur in amounts that do not preclude the effect the characteristic was intended to provide. By way of illustration, in some examples, the terms "substantially" and "approximately", can mean a range of within 5% of the stated characteristic.

As used herein, statements that a second item is "based on" a first item can mean that properties of the second item are affected or determined at least in part by properties of the first item. The first item can be considered an input to an operation or calculation, or a series of operations or calculations that produces the second item as an output that is not independent from the first item.

The contents of all published documents identified in this disclosure are incorporated herein by reference.

The invention claimed is:

1. A computer-implemented method for identifying and remediating plagiarism, comprising:

causing, by one or more processors, natural language processing (NLP) based segmentation of a text document to obtain a plurality of extracted text segments that are selectively classified as either key segments or non-key segments based on named entity recognition (NER) performed in respect of the extracted text segments;

identifying, by the one or more processors, one or more of the extracted text segments as plagiarized text segments, the identifying comprising: (i) selectively querying only in respect of the extracted text segments classified as key segments, via a first application programming interface (API), a first query platform, and (ii) receiving, in response to the querying, at least one respective candidate matching text segment from the first query platform for at least one of the key segments; and for each extracted text segment identified as a plagiarized text segment:

generating, by the one or more processors, a set of instructions for a generative artificial intelligence (AI) model that instruct the AI model to rephrase the extracted text segment;

providing, by the one or more processors, the set of instructions to the AI model via a second API; and receiving a response from the AI model that includes a rephrased text segment generated by the AI model, wherein, the first query platform includes a vector database comprising vector embeddings of respective reference text segments extracted from literary works, the method further comprising obtaining a respective vector embedding for each of the extracted text segments for which the first query platform is to be queried in respect of;

wherein querying the first query platform in respect of an extracted text segment causes the vector database to be searched to identify reference text segments having vector embeddings that meet a similarity criteria with respect to the respective vector embedding obtained for the extracted text segment, and wherein the respective reference text segment for any reference text vector embedding that meets the similarity criteria is identified as a respective candidate matching text segment for the extracted text segment.

2. The computer-implemented method of claim 1 wherein identifying the one or more extracted text segments as plagiarized text segments further comprises, by the one or more processors:

(iii) for each extracted text segment for which at least one respective candidate matching text segment is received, identifying the extracted text segment as a plagiarized text segment responsive to determining that a similarity between the extracted text segment and the respective candidate matching text segment meets a similarity threshold.

3. The computer-implemented method of claim 1 wherein the similarity criteria comprises at least one of: a cosine distance; a Jaccard similarity; a word embedding vector distance; or a Levenshtein distance.

4. The computer-implemented method of claim 2, wherein identifying one or more of the extracted text segments as plagiarized text segments further comprises, by the one or more processors:

generating one or more queries via a third API for a second query platform requesting identification of one or more respective candidate matching text segments for the one or more of the extracted text segments; and receiving a response to the one or more queries.

5. The computer-implemented method of claim 1 comprising selectively querying in respect of the extracted text segments classified as key segments, a second query platform, and (ii) receiving, in response to the querying, at least one respective candidate matching text segment from the second query platform for at least one of the key segments, wherein the first second query platform comprises a metasearch engine that is configured to provide corresponding queries to and aggregate results from multiple search engines based on the querying.

6. The computer-implemented method of claim 1 comprising selectively querying in respect of the extracted text segments classified as key segments, a second query platform, and (ii) receiving, in response to the querying, at least one respective candidate matching text segment from the second query platform for at least one of the key segments, wherein the first second query platform comprises a plagiarism check engine.

7. The computer-implemented method of claim 2 wherein the similarity threshold is based on identifying a defined number of identical consecutive words occurring in the extracted text segment and the respective candidate matching text segment.

8. The computer-implemented method of claim 1 further comprising, by the one or more processors, for at least one rephrased text segment received from the AI model in respect of one of the extracted text segments:

performing an automated check to identify if the at least one rephrased text segment is a further plagiarized text segment, the performing comprising: querying, via the first API, the first query platform, and determining if a respective candidate matching text segment is received from the first query platform;

when the performing of the automated check to identifies the at least one rephrased text segment as a further plagiarized text segment, generating a further set of instructions for the AI model that instruct the AI model to rephrase the at least one rephrased text segment;

providing the further set of instructions to the AI model via the second API and receiving a further response from the AI model that includes a further rephrased text segment generated by the AI model; and substituting the further rephrased text segment for the extracted text segment.

9. The computer-implemented method of claim 1 wherein the AI model comprises a large language model (LLM).

10. The computer-implemented method of claim 1 further comprises, for each rephrased text segment:

causing, by the one or more processors, a graphical user interface (GUI) to be generated that enables a client device to receive user inputs that accept and amend the rephrased text segment; and responsive to receiving a user input accepting the rephrased text segment, amending the text document by substituting the rephrased text segment, with any user input amendments, for the extracted text segment.

11. The computer-implemented method of claim 1 wherein the text document comprises question unit content for an examination question, the question unit content including: a question related to a question scenario; a set of answer choices; for each answer choice, an indication of whether the answer choice is correct or incorrect and an explanation of why the answer choice is correct or incorrect; and identification of at least one reference that supports the set of answer choices.

12. A computer system comprising one or more processors and one or more memories storing machine-executable instructions thereon which, when executed by the one or more processors, cause the computer system to perform a method for identifying and remediating plagiarism comprising:

causing, by one or more processors, natural language processing (NLP) based segmentation of a text document to obtain a plurality of extracted text segments that are selectively classified as either key segments or non-key segments based on named entity recognition (NER) performed in respect of the extracted text segments;

identifying, by the one or more processors, one or more of the extracted text segments as plagiarized text segments, the identifying comprising: (i) selectively querying only in respect of the extracted text segments classified as key segments, via a first application programming interface (API), a first query platform, and (ii) receiving, in response to the querying, at least one respective candidate matching text segment from the first query platform for at least one of the key segments; and for each extracted text segment identified as a plagiarized text segment:

generating, by the one or more processors, a set of instructions for a generative artificial intelligence (AI) model that instruct the AI model to rephrase the extracted text segment;

providing, by the one or more processors, the set of instructions to the AI model via a second API; and receiving a response from the AI model that includes a rephrased text segment generated by the AI model wherein, the first query platform includes a vector database comprising vector embeddings of respective reference text segments extracted from literary works, the method further comprising obtaining a respective vector embedding for each of the extracted text segments for which the first query platform is to be queried in respect of;

wherein querying the first query platform in respect of an extracted text segment causes the vector database to be searched to identify reference text segments having vector embeddings that meet a similarity criteria with respect to the respective vector embedding obtained for the extracted text segment, and wherein the respective reference text segment for any reference text vector embedding that meets the similarity criteria is identified as a respective candidate matching text segment for the extracted text segment.

13. The system of claim 12 wherein identifying the one or more extracted text segments as plagiarized text segments further comprises, by the one or more processors:

(iii) for each extracted text segment for which at least one respective candidate matching text segment is received, identifying the extracted text segment as a plagiarized text segment responsive to determining that a similarity between the extracted text segment and the respective candidate matching text segment meets a similarity threshold.

14. The system of claim 12, wherein the similarity criteria comprises at least one of: a cosine distance; a Jaccard similarity; a word embedding vector distance; or a Levenshtein distance.

15. The system of claim 13, wherein identifying one or more of the extracted text segments as plagiarized text segments further comprises, by the one or more processors:

generating one or more queries via a third API for a second query platform requesting identification of one or more respective candidate matching text segments for the one or more of the extracted text segments; and receiving a response to the one or more queries.

16. The system of claim 12 wherein the first query platform further comprises a plurality of search platforms including one or more of: a metasearch engine that is configured to provide corresponding queries to and aggregate results from multiple search engines based on the queries; and/or a plagiarism check engine.

* * * * *